United States Patent

[11] 3,569,630

[72] Inventors Jerome Parks
Marina del Rey;
Donald D. Kane, Torrance, Calif.
[21] Appl. No. 605,525
[22] Filed Dec. 9, 1966
[45] Patented Mar. 9, 1971
[73] Assignee Said Kane assignor to said Parks

[54] CYCLICALLY CONTROLLED TELEPHONE ANSWERING DEVICE HAVING A SECTIONED RECORDING MEDIUM FOR INCOMING AND OUTGOING MESSAGES
8 Claims, 23 Drawing Figs.

[52] U.S. Cl. .......... 179/6
[51] Int. Cl. .......... H04m 1/64
[50] Field of Search .......... 179/6, 6 (AC), 6 (CO); 200/178

[56] References Cited

UNITED STATES PATENTS

| | | | |
|---|---|---|---|
| 3,299,209 | 1/1967 | Roger | 179/6X |
| 2,154,722 | 4/1939 | Bloxsom | 179/6 |
| 2,866,852 | 12/1958 | Miller et al. | 179/6 |
| 2,928,898 | 3/1960 | Salzberg et al. | 179/6 |
| 3,250,856 | 5/1966 | Muller | 179/6 |
| 3,319,003 | 5/1967 | Prager | 179/6UX |

FOREIGN PATENTS

| | | | |
|---|---|---|---|
| 792,146 | 3/1958 | Great Britain | 179/6 |
| 923,597 | 4/1963 | Great Britain | 179/6 |

*Primary Examiner*—Bernard Konick
*Assistant Examiner*—Raymond F. Cardillo, Jr.
*Attorney*—Henry N. Bissell

ABSTRACT: An electromechanical device for responding to the ringing of a telephone instrument by answering with a prerecorded message and then recording communications incoming over the telephone line. The device provides for manual control of the recording of the prerecorded message and the playback of the incoming communications as recorded.

INVENTORS
Jerome Parks
Donald D. Kane
By Smyth, Roston & Pavitt
ATTORNEYS

INVENTORS
Jerome Parks
Donald D. Kane
By Smyth, Roston & Pavitt,
ATTORNEYS

INVENTORS
Jerome Parks
Donald D. Kane
By Smyth, Roston & Pavitt
ATTORNEYS

FIG. 10
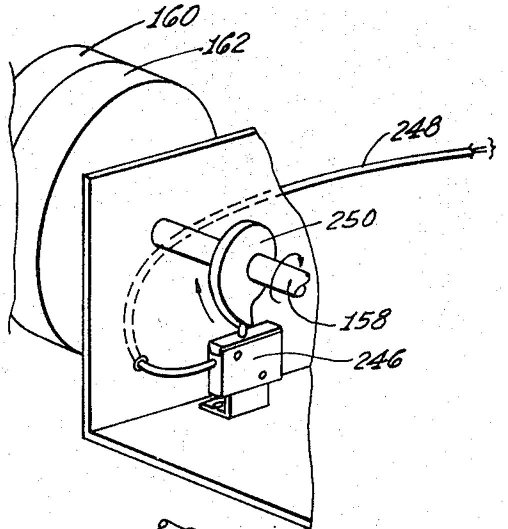
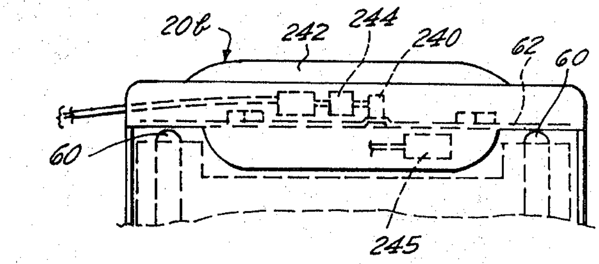
FIG. 10a
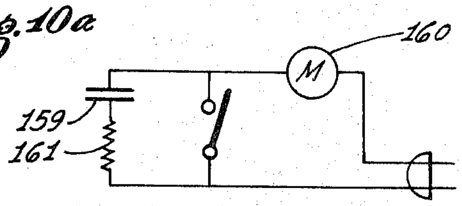
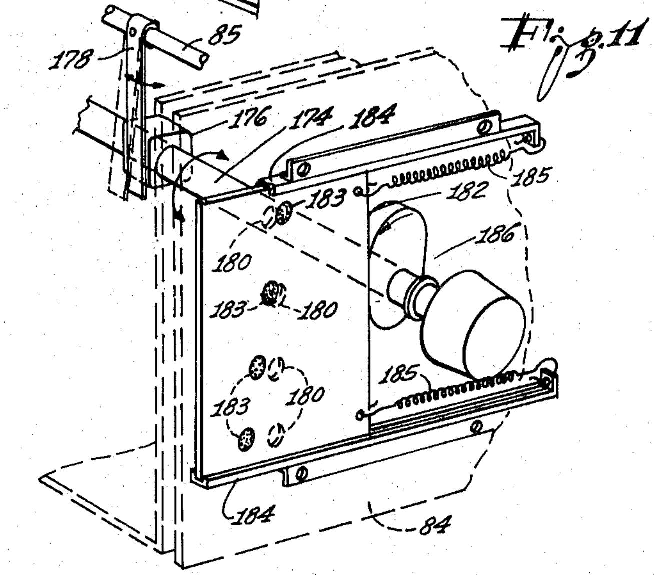
FIG. 11
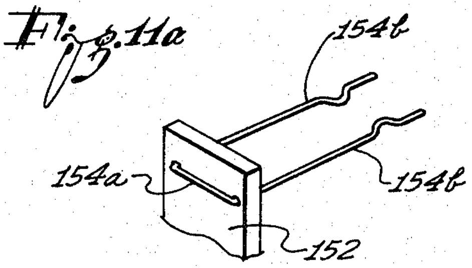
FIG. 11a
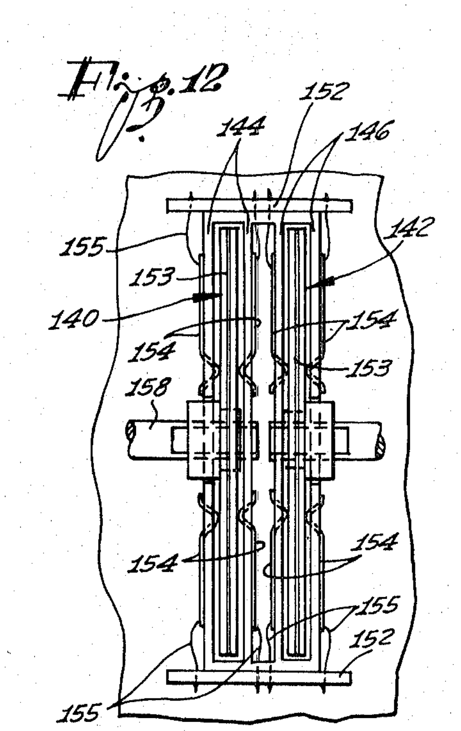
FIG. 12
INVENTORS
Jerome Parks
Donald D. Kane
By Smyth, Roston & Pavitt
ATTORNEYS INVENTORS
Jerome Parks
Donald D. Kane
By Smyth, Roston & Pavitt
ATTORNEYS INVENTORS
Jerome Parks
Donald D. Kane
By Smyth, Roston & Pavitt
ATTORNEYS INVENTORS
Jerome Parks
Donald D. Kane
By Smyth, Roston & Pavitt
ATTORNEYS

CYCLICALLY CONTROLLED TELEPHONE ANSWERING DEVICE HAVING A SECTIONED RECORDING MEDIUM FOR INCOMING AND OUTGOING MESSAGES

This invention relates to a device for automatically answering a telephone and recording the incoming messages. It will be apparent, however, that many of the innovations of the invention taken separately are applicable to other devices in various other fields.

When Edison first disclosed that sound could be recorded for playback on a physically impressionable recording medium, inventors quickly recognized the possibility of utilizing a sound recording means in a mechanism for automatically answering a telephone and not only reproducing an outgoing message but also recording incoming messages in sequence for future playback. As the art of recording sound evolved from reliance on purely mechanical recording to mechanical recording combined with electronic amplification and finally magnetic recording, inventors kept pace with developments in the telephone answering field with the consequent accumulation of voluminous art in the patent archives.

Nearly all of the prior art developments serve their basic purpose and many are practical to the extent that the disclosed devices may be manufactured and sold to serve the basic need. It is a surprising fact, however, that the presently available answering devices, culminating such an impressive history of development, fall far short of the potential for widespread utilization of such devices. The prior art mechanisms are too complicated and have too many parts for economical production. Consequently, such telephone answering devices as are currently available are expensive, bulky, relatively heavy and require nearby servicing facilities. Convenient service centers are mandatory because the answering devices are too cumbersome and heavy for convenient transportation and because the devices are characterized by numerous switches and relays that are susceptible to malfunctioning and failure. The currently available telephone answering devices are further characterized by the inclusion of parts made of organic materials that deteriorate over relatively short time intervals. In practice such telephone answering devices should not be installed at a distance of more than 50 miles from a service center.

The invention avoids these difficulties by a number of improvements including drastic structural simplification, the elimination of numerous relays and switches, the avoidance of massive wiring, and the elimination of parts that deteriorate on a short time scale. In addition the invention eliminates the use of solenoids and the consequent necessity of a special DC power supply.

Structural simplification is achieved in large part by using a cyclic control in the form of a single rotary switch the rotary switch being incorporated in a unitary rotary assembly that provides simple mechanical actuation of different moving parts at different stages in the automatic cycle. As will be explained structural simplification is achieved in further part by providing a rotary manual control incorporating a second rotary switch, the two rotary switches being advantageously intimately related and sharing common circuitry, The actual number of parts is reduced to less than 200 in contrast to the many thousand parts in currently available telephone answering devices and the presently preferred embodiment of the invention is so compact, so light in weight and inherently so rugged that it may be conveniently mailed to a distant service center if any servicing ever becomes actually necessary.

As will be explained, a special feature of the invention resides in a novel solution of the problem of eliminating wow and flutter. This solution meets the purpose of the invention in that it both simplifies the structure and eliminates the use of elastomeric materials that are subject to undue deterioration with the passage of time.

Other shortcomings of typical prior art devices are, first, that the installation procedure is necessarily far from simple, and, second, that the installation of the telephone answering device permanently encumbers the telephone to deprive the subscriber of his accustomed freedom in the use of the telephone. The present invention avoids these further difficulties by providing an answering device that has an auxiliary cradle attached thereto by a flexible operating connection. The installation procedure is reduced to the ultimate simplicity of requiring merely that the device be plugged into a convenient electrical outlet and the auxiliary cradle be placed between the conventional cradle and the handset of the telephone to restore its original unencumbered state for use with the usual manual freedom.

A further feature of the invention with reference to the installation of the device is the provision of interchangeable pickup components in the auxiliary cradle for use with different types of telephones. No special skill is required to adapt the device to a particular type of telephone.

Going beyond solving the basic problem as summarized above, the present embodiment of the invention provides two new features of importance to a subscriber. One of these features may be described as instant playback since it enables the subscriber to select and play back any one of a number of prior recorded incoming messages without time delay. The other feature is the inclusion in the telephone answering device of a loudspeaker in close proximity to the telephone which broadcasts an incoming call without permitting feedback through the telephone. The broadcast gives the subscriber the choice of personally answering the phone or of letting the answering device carry out its usual cycle. If desired, a speaker mike may be substituted for the loudspeaker to permit the subscriber to listen to the incoming message in private.

As will be explained one further feature of the invention relates to improvements in the means for sensing the operation of the ringing circuit of the telephone without any possibility of erroneously responding to the energization of some nearby electrical appliance. Another further feature is the provision of a novel indicating mechanism for guidance in manipulation of the manual control for carrying out selected stages of the automatic cycle.

The various features and advantages of the invention may be understood from the following detailed description and the accompanying drawings.

In the drawings, which are to be regarded as merely illustrative:

Figure 1:
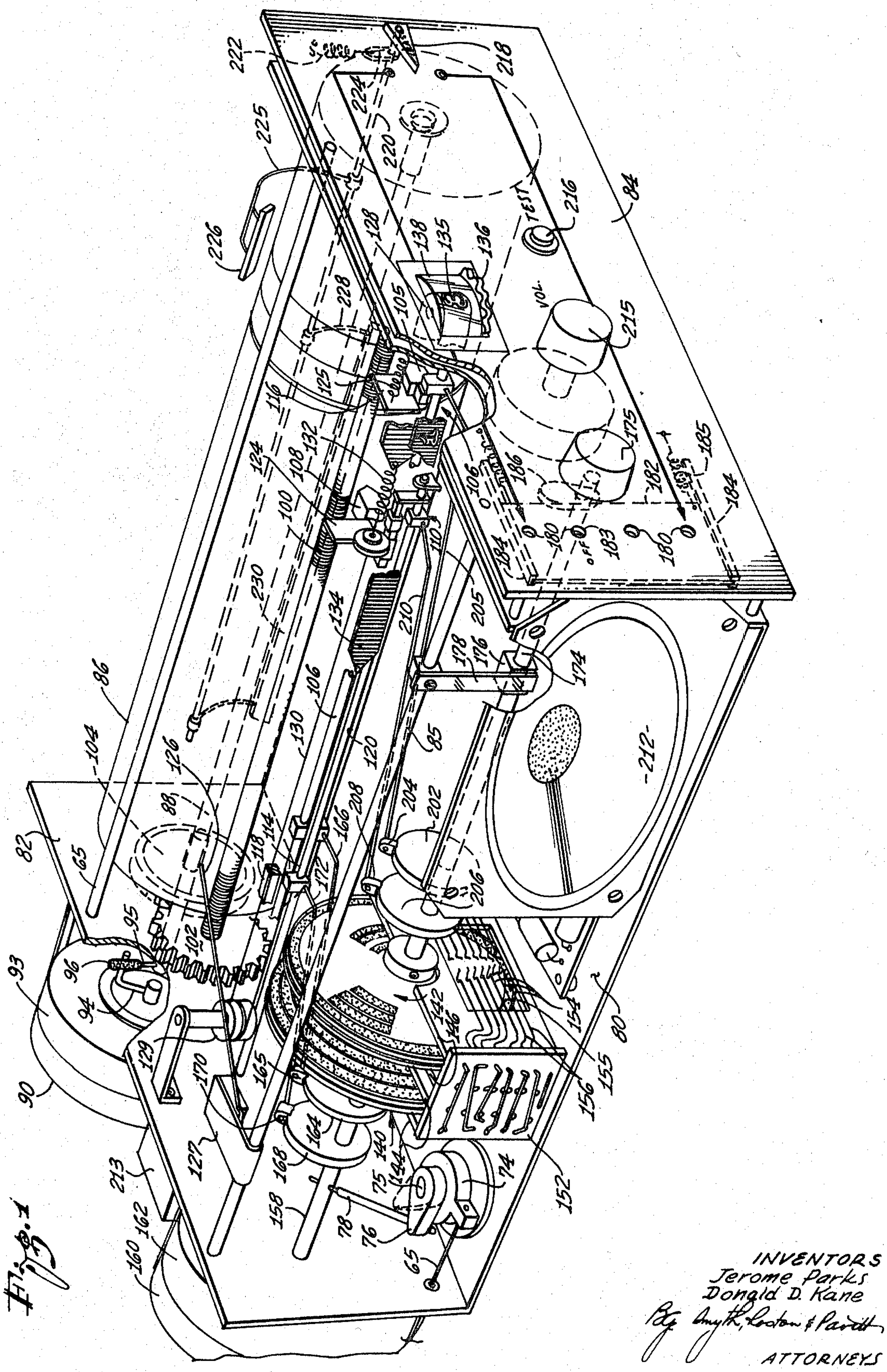
FIG. 1 is a simplified perspective view of the major portion of the mechanism in a housing to be placed alongside a telephone, some of the housing walls being removed and portions of the structure being broken away.
Figures 2, 2A:
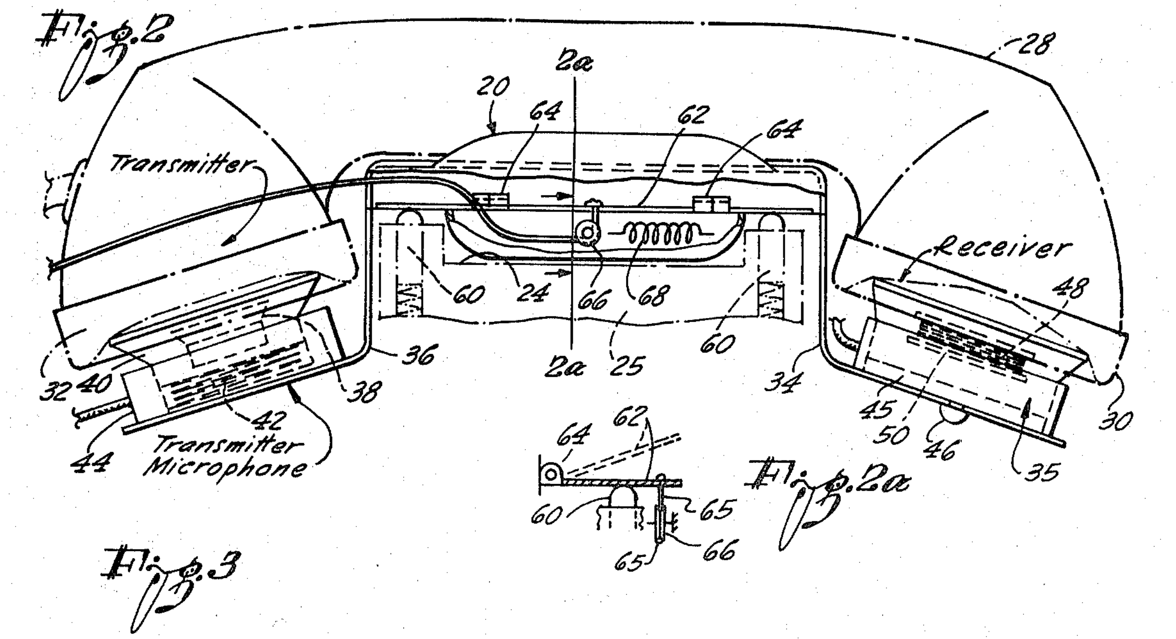
FIG. 2 is a side elevational view of the auxiliary cradle that is interposed between the cradle of the telephone and the handset.
Figure 3:
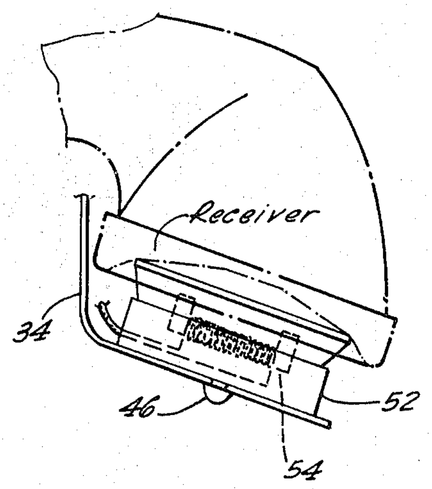
Figure 4:
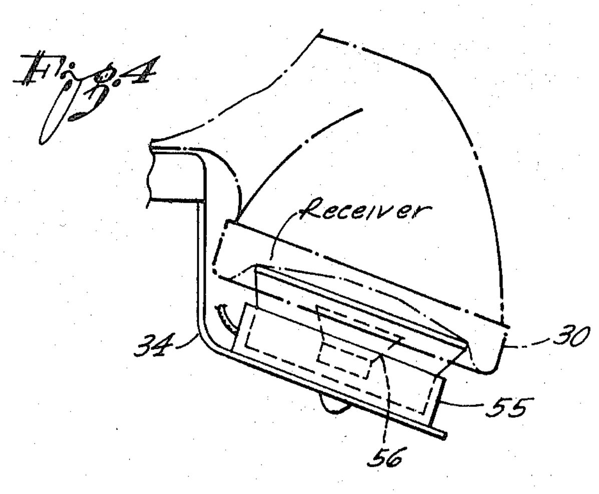
Figure 5:
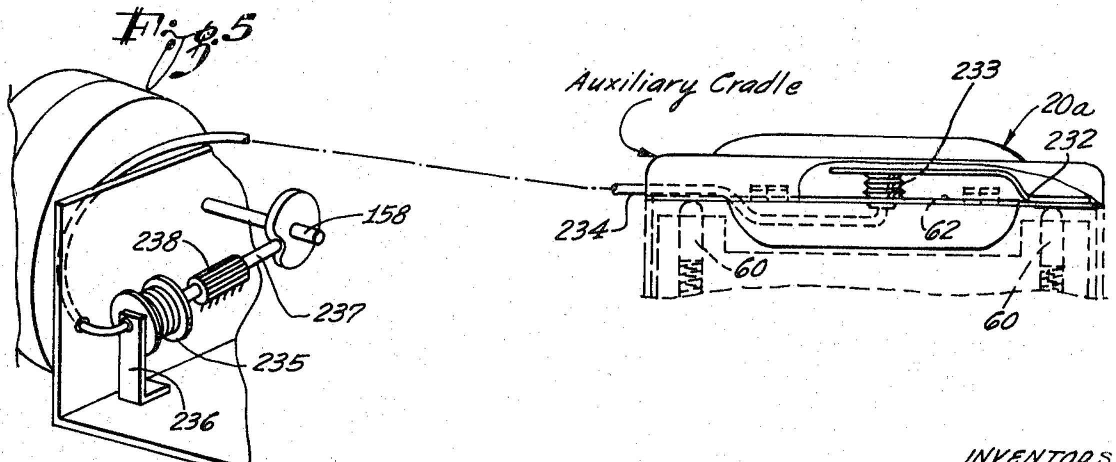
Figures 6, 7, 8, 9:
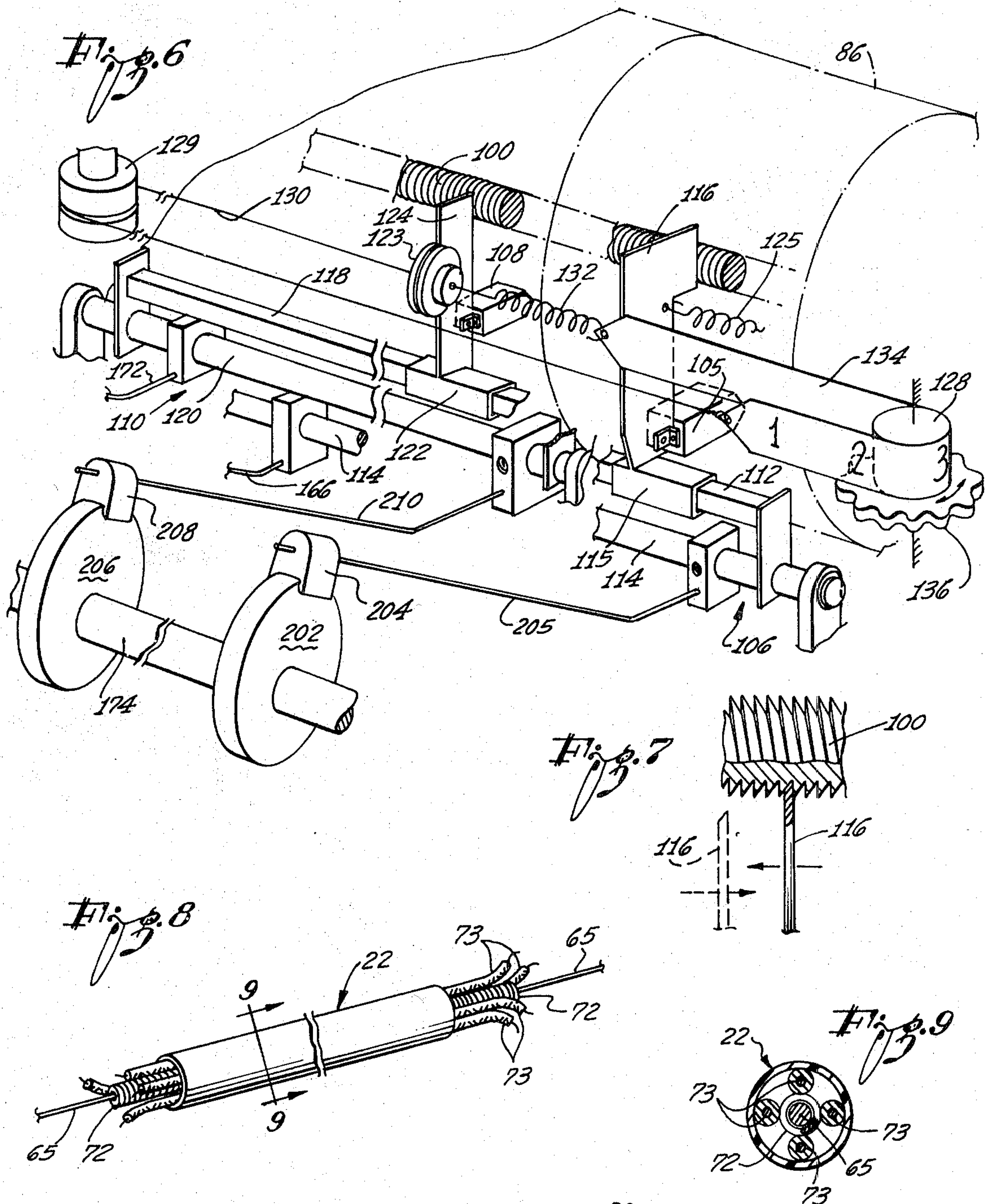
Figure 9A:
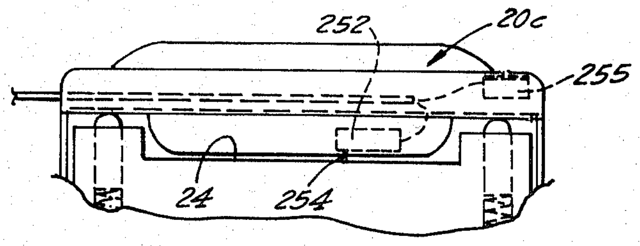
Figures 13, 14, 15, 16, 17:
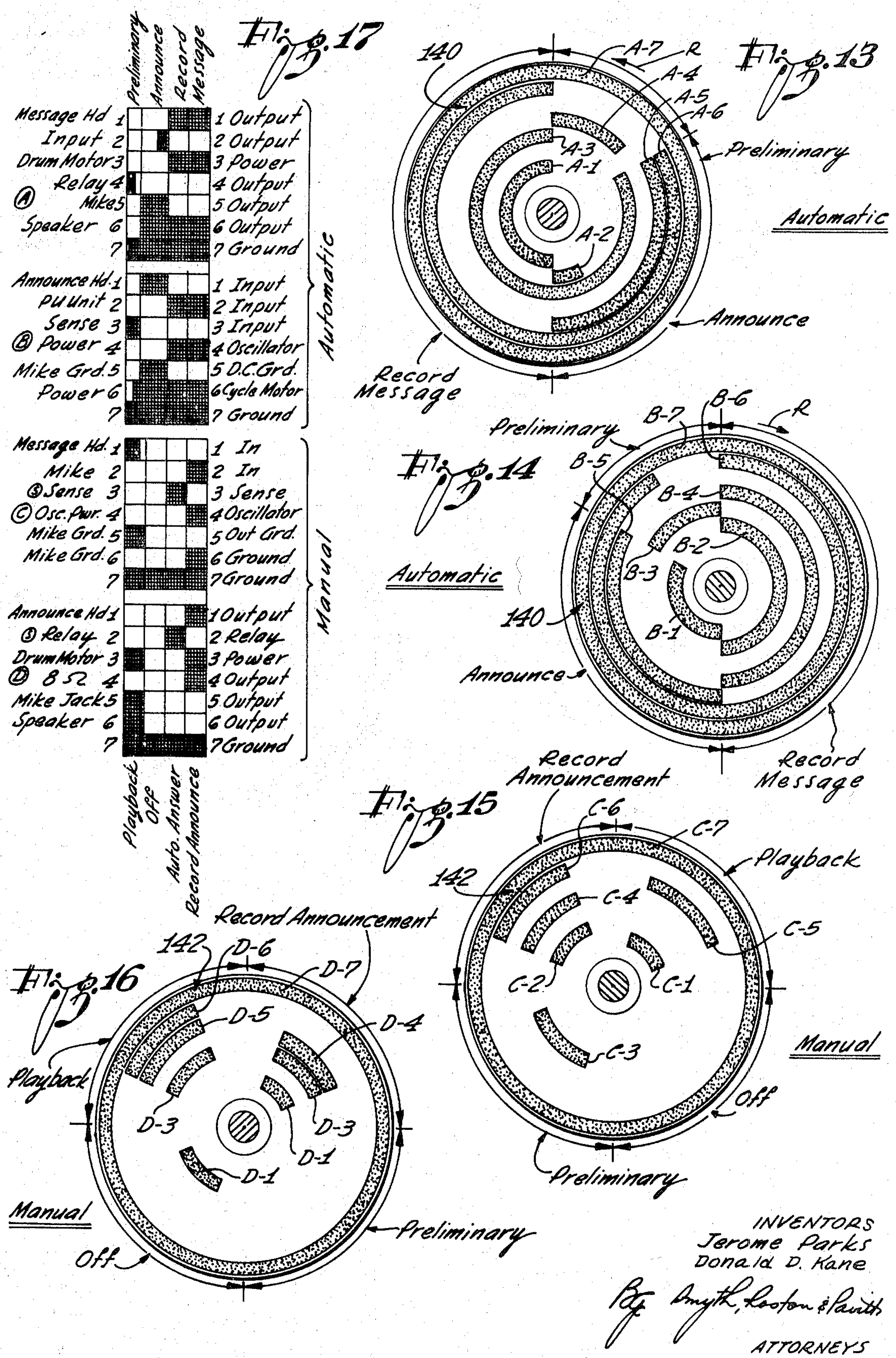
Figure 18:
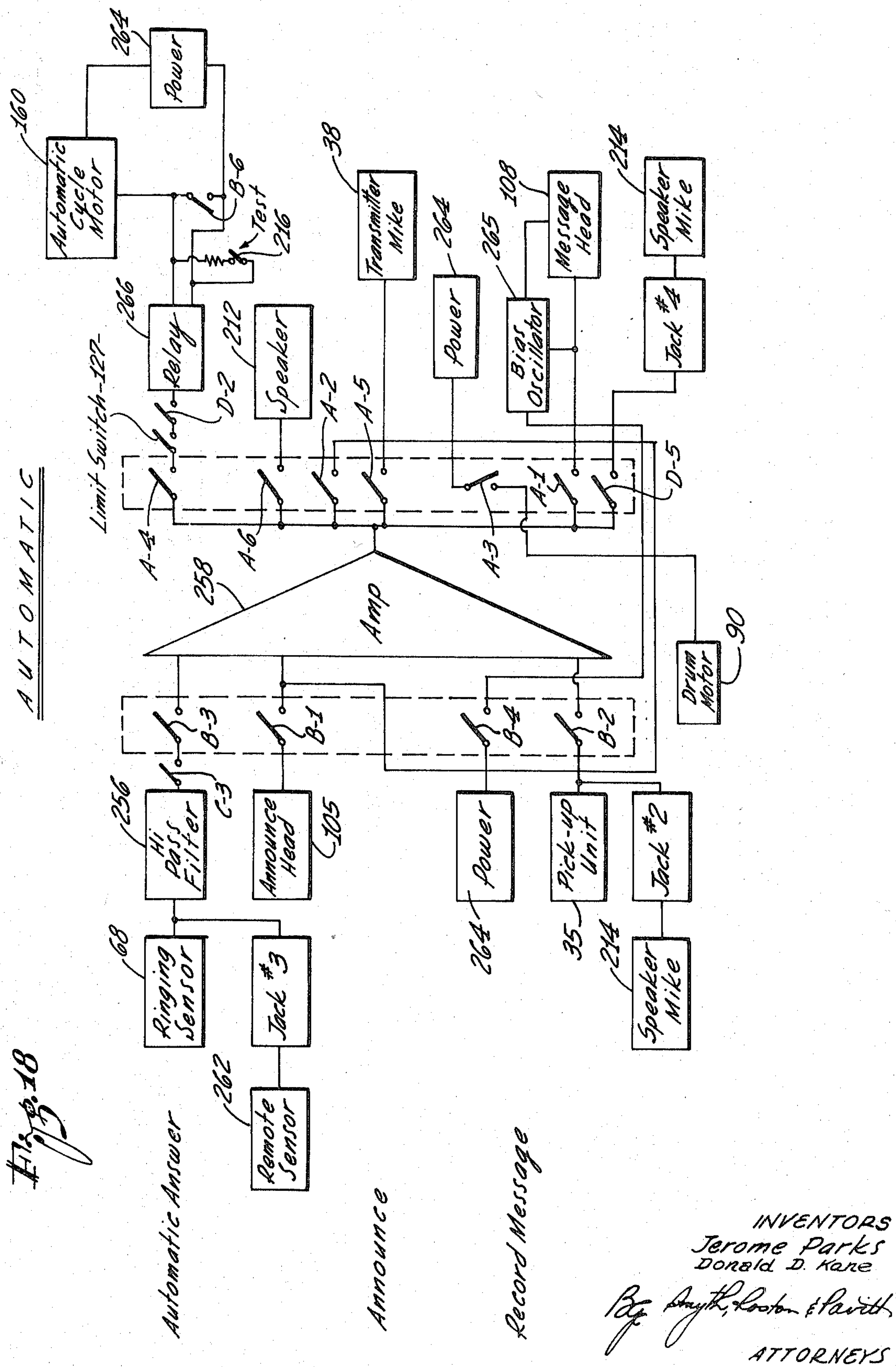
Figure 19:
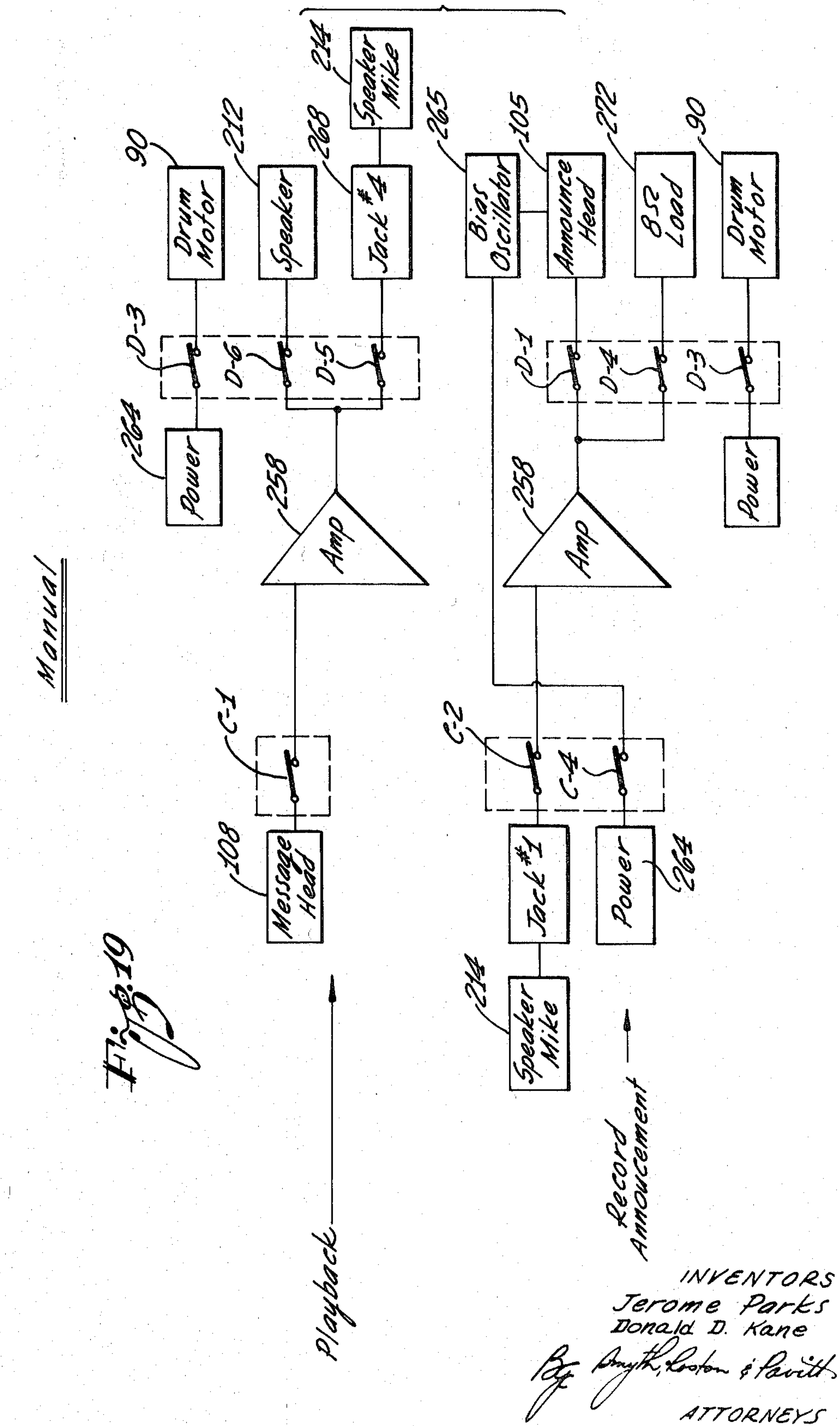

FIG. 2*a* is a transverse section taken along the line 2*a*–2*a* of FIG. 2 showing a means for normally depressing the plungers of the telephone;

FIG. 3 is a fragmentary side elevational view showing a different pickup unit that may be substituted for the pickup unit shown in FIG. 2;

FIG. 4 is a similar view of a third pickup unit that may be substituted for the pickup unit shown in FIG. 2;

FIG. 5 is a somewhat schematic view showing how a fluid-actuated system may be employed to control the switch-depressing means in the auxiliary cradle;

FIG. 6 is an enlarged fragmentary perspective view showing how the two transducers cooperate with a lead screw for movement along a recording drum;

FIG. 7 is a fragmentary sectional view showing how a transducer engages the lead screw;

FIG. 8 is a fragmentary diagrammatic perspective view of a portion of the flexible tubular connector that operatively connects the auxiliary cradle with the structure in the housing in FIG. 1;

FIG. 9 is a transverse section taken as indicated by the line 9–9 of FIG. 8;

FIG. 9*a* is a somewhat diagrammatic view of an alternate sensor for detecting the ringing of the telephone;

FIG. 10 is a somewhat diagrammatic view showing how a remotely controlled motor in the cradle may be used to actuate the switch-depressing means in the auxiliary cradle;

FIG. 10*a* is a wiring diagram of a circuit to increase the coasting of the cycle motor;

FIG. 11 is a fragmentary diagrammatic perspective view of means cooperative with the front panel (not shown) to indicate the four settings of the manual control;

FIG. 11*a* is a fragmentary perspective view showing how two wiper elements for the two rotary switches respectively may be made in one piece;

FIG. 12 is a plan view of the two switch rotors and associated fixed structure, one switch rotor being employed for the cyclic control of the mechanism, the other switch rotor being employed for manual control;

FIG. 13 is an elevational view of one face of the switch rotor employed for cyclic control;

FIG. 14 is a similar view of the other face of the switch rotor;

FIG. 15 is a similar view of one face of the switch rotor employed for manual control;

FIG. 16 is a similar view of the other face of the switch rotor employed for manual control;

FIG. 17 is a diagram showing four functional blocks involved in the cyclic control and the manual control of the device;

FIG. 18 is a block diagram showing the various interconnections involved in the automatic cyclic operation of the device; and FIG. 19 is a block diagram of the interconnections involved in various settings of the manual control.

The presently preferred embodiment of the invention shown in the drawings includes a housing of the character shown in FIG. 1 that is intended to be positioned adjacent the telephone, the housing being electrically connected to a powerpack (not shown) that is adapted to be plugged into an electrical outlet. The invention further includes an auxiliary cradle, generally designated 20 in FIG. 2 which is operatively connected to the mechanism in the housing by a flexible tube 22 of the construction shown in FIGS. 8 and 9.

FIG. 2 shows the auxiliary cradle 20 resting on the conventional cradle 24 of a base unit 25 of a telephone, the auxiliary cradle being interposed between the conventional cradle 24 and the handset of the telephone. The handset includes the usual handle 28 with an earpiece 30 on one end of the handle incorporating the telephone receiver and a mouthpiece 32 on the other end incorporating the telephone transmitter. The auxiliary cradle 20 has an angular metal arm 34 on one end which carries a pickup unit 35 for cooperation with the earpiece 30 and has a similar arm 36 on its other end with carries a transmitter microphone 38 for cooperation with the mouthpiece 32.

The transmitter microphone 38 is mounted inside a flared cup 40 which in turn is floatingly mounted by a coil spring 42 inside a cylindrical base 44. The spring 42 urges the flared cup 40 into snug pressure contact with the earpiece 32, the flared cup having freedom to align itself automatically with the mouthpiece. It has been found that a flared cup 40 made of soft aluminum with a wall thickness of at least .020 inch serves effectively to isolate the telephone transmitter in the mouthpiece 32 from room noises, the soft aluminum having an inherent dampening action to function as a mechanical filter.

The pickup unit 35 has a cylindrical base 45 which is adapted for removable attachment to the arm 34 of the auxiliary cradle. In the construction shown, the cylindrical base 45 has an expansile mounting lug 46 which yieldingly extends through an aperture in the arm 34 so that the pickup unit 35 may be replaced by other types of pickup units as required for different types of telephones. The pickup unit 35 includes a pickup coil 48 wound on a thin spool 50 and is effective to respond to the flux created by a receiver 30 of the prevalent type of telephone, i.e. the AT&T Western Electric Model 500.

The receiver of another type of telephone that is in the minority, i.e. the General Telephone Auto Electric Model, emanates only a relatively weak field of flux and requires a more sensitive pickup unit. FIG. 3 shows how a pickup unit 52 for this purpose may be plugged into the auxiliary cradle 20 in substitution for the pickup unit 35 to respond to the weaker flux. The pickup unit 52 has a U-shaped core 54 of highly permeable metal around which is wound 2,000 or more turns of an exceedingly fine wire.

There is a third type of telephone, the receiver of which does not emanate appreciable flux. For use with this third type of telephone, a pickup unit 55 shown in FIG. 4 is plugged into the auxiliary cradle. This third pickup unit incorporates a small microphone 56 for acoustic coupling with the receiver 30 of the handset.

The conventional cradle 24 of the telephone has the usual answer switch in the form of a pair of spring pressed buttons or plungers 60. In the conventional operation of the telephone the plungers 60 of the answer switch are normally retracted by the weight of the handset 28 so that lifting the handset from the cradle releases the plungers 60 to close a circuit for answering an incoming call. A feature of the invention in this regard is the concept of incorporating into the construction of the cradle 20 suitable means to keep the two plungers 60 depressed and to release the two plungers automatically in response to an incoming call.

In this particular embodiment of the invention, as shown in FIGS. 2 and 2*a*, the means in the auxiliary cradle 20 that normally depresses the two plungers 60 comprises a leaf 62 that is hinged on pivots 64. Normally the leaf 62 is held down by a tensioned cable 65 which passes under a guide pulley 66. The auxiliary cradle 20 further includes a sensor in the form of a suitable coil 68 to sense the operation of the ringing circuit of the telephone. When the telephone rings, the sensing coil 68 creates a signal which results in release of the flexible cable 65 to permit the two plungers 60 to extend upward to close the receiving circuit of the telephone.

The auxiliary cradle 20 is connected to the housing shown in FIG. 1 by the previously mentioned flexible tube in FIGS. 8 and 9, which tube may be made of a suitable plastic. The flexible tube 22 encloses the flexible cable 65 that operates the hinged leaf 62, the flexible cable 65 that operates the hinged leaf 62, the flexible cable having a coiled wire sheath 72. The flexible tube 22 also encloses various covered wires 73 associated with the sensing coil 68, the pickup unit 35 and the transmitter microphone 38.

As shown in FIG. 1, the second end of the flexible cable 65 is connected to a control member 74 that is rotatably mounted on a spindle 75 and is provided with an operating finger 76. As will be explained, a radial arm 78 normally holds the operating finger 76 in a position to keep the cable 65 taut with the hinged leaf 62 depressing the plungers 60 of the telephone.

The housing shown in FIG. 1, which encloses the major working parts of the answering device has a bottom wall 80, a back wall 82 and a front wall 84 which serves as a control panel, the front wall and back wall being connected by various longitudinal connecting rods 85. A recording cylinder or drum 86 which may be a brass body of moderate mass extends lengthwise of the housing between the front and back wall and is fixedly mounted on a shaft 88 that is operated by a suitable motor 90. A crank 94 on a shaft actuated by the motor through a gear box 93 drives an arm 95 that is fixedly mounted on the shaft 88. The drum 86 is permanently covered with magnetic recording material which may be in the form of a strip of plastic applied spirally to the drum. For reasons to be explained it is important to note that torque is transmitted from the motor-driven shaft to the drum shaft 88 through a suitable damping medium which, in this embodiment of the invention is a plastic sleeve 96 of vinyl or the like on the arm 95.

Adjacent the drum 86 and parallel with the axis of the drum is a suitable lead screw 100 carrying a driven gear 102 which meshes with a drive gear 104 on the drum shaft 88. Preferably both the drum shaft 88 and the lead screw 100 are rotated at 30 r.p.m. Because the drum 86 has a permanently mounted recording medium and the drum is driven in a positive manner, any transducer that is moved by the lead screw 100 will always follow the same spiral track around the drum. A minor longitudinal portion of the recording drum adjacent the front wall 84 is employed to prerecord an outgoing message or announcement and the remaining longitudinal portion of the drum extending towards the back wall 82 is utilized for recording a succession of incoming messages. Preferably there is space on the drum for 15 successive incoming messages.

A first transducer or sound head 105 for reproducing the outgoing message is mounted on a first guide means, generally designated 106 in FIGS. 1 and 6, and a second transducer 108 for recording and playing back the incoming messages is mounted on a second guide means that is generally designated 110. The first guide means 106 is a frame comprising an upper square rod 112 and a lower parallel round rod 114, the lower rod 114 being journaled in suitable bearings for hingedly mounting the guide means with freedom for the guide means with freedom for the guide means to swing towards and away from the lead screw 100. The first transducer 105, which may be termed the announce head, is mounted on a suitable carriage 115 that is slidably mounted on the square guide rod 112. The carriage includes a blade 116 which is adapted for engagement with the lead screw 100 in the manner shown in FIG. 7 to cause the lead screw to drive the announce head along the surface of the recording drum 86.

In like manner, the second guide means 110 comprises an upper square rod 118 and a lower parallel round rod 120 with the lower guide rod journaled in suitable bearings for hingedly mounting the second guide means. The second transducer 108, which may be termed the message head, is mounted on a carriage 122 that slides along the square rod 118 and the carriage includes a blade 124 for engaging the lead screw 100 to drive the message head along the surface of the drum.

The announce head 105 has a normal starting position near the front wall 84 of the housing. To cause the announce head 105 to reproduce the prerecorded outgoing message, the first guide means 106 is rocked from a normal retracted position to an operating position at which the blade 116 engages the lead screw 100 to move the announce head to the left as viewed in FIGS. 1 and 6. Preferably, approximately 20 seconds is allotted for reproducing the outgoing message. At the end of the allotted time period the first guide means 106 is swung to its retracted position to disengage the blade 116 of the lead screw 100 and to permit a suitable spring 125 to return the announce head 105 to its normal starting position.

To record an incoming message, the second guide means 110 is rocked from its retracted or ineffective position to its operating position to place the blade 124 in engagement with the lead screw 100. Preferably a time period of approximately 30 seconds is allotted to the recording of an incoming message. At the end of the allotted period of time, the second guide means 110 is swung back to its normal position to retract the blade 124 out of engagement with the lead screw 100. Thus each cycle of operation of the answering device advances the message head 108 by a predetermined increment which amounts to one-fifteenth of the space available on the recording drum for a succession of incoming messages. After recording the 15 incoming message, the message head encounters the operating arm 126 of a limit switch 127 to make the message head nonresponsive to further incoming calls without erasing any previously recorded incoming messages.

The importance of the previously mentioned sleeve 96 of nonelastomeric damping material, may be understood from a consideration of the problems involved in selecting a suitable transmission means for speed reduction from a motor shaft to a rotating recording medium. Speed reduction gearing is much to be desired because gears provide a positive coupling to maintain exact synchronism and gears do not require maintenance or replacement. The disadvantage, however, is that gears generate two kinds of noise, namely low magnitude random noise and cyclic disturbances which are locked to the angular displacement of the rotary recording medium. The random noise may be alleviated if not eliminated by resorting to large masses for high inertia and by using highly resilient transmission means. Such a transmission means may, for example, be a resilient elastomeric belt interconnecting two pulleys or may be a relatively small elastomeric drive wheel in frictional contact with a larger driven elastomeric wheel. Unfortunately, however, elastomeric coupling devices permit slippage and they crack, glaze over and otherwise deteriorate with time to necessitate eventual replacement.

The present invention meets this situation by employing rigid reduction gears and by making effective provisions for circumventing the two kinds of noise that are generated by the gears. Instead of attempting to absorb all of the flutter generated by the gears, the invention employs relatively dead damping means to absorb only the low magnitude noise. The remaining cyclic error is transmitted by the vinyl sleeve but is cancelled out by playing back the error in synchronism with the original recording error. Only slight resiliency is required of the nonelastomeric damping material for absorption of the low magnitude noise and suitable damping materials which include vinyl, balsa wood and common cotton string would not be classified as resilient or elastic. The relatively dead damping material is necessarily of yielding character but the time constant of deformation and recovery must be substantially greater than the time interval between recording and playback. Thus the vinyl sleeve 96 yields to the pressure of the crank 94, the sleeve being indented by the crank, but the indentation is constant within the time interval between the recording of an incoming message and the playback of the incoming message. The fact that the depth of indentation may change gradually over a period of longer time is of no consequence.

A feature of the invention is the provision of means for manually shifting the message head 105 along the first guide means 106 for random access to the recorded incoming messages and the further provision of suitable index means to indicate the location of the message head with respect to the individual recorded incoming messages.

Referring now to the provision for random access to the recorded incoming calls, the equivalent of an endless belt is connected to the carriage 122 by a fitting 123, the endless belt being formed into two parallel runs by a forward pulley 128 and a rearward pulley 129. The endless belt may comprise three members connected end to end, namely a thin flexible cable 130, a short coil spring 132 and a ribbon 134 having spaced numerals 135 thereon designated the incoming recorded messages in sequence. The forward pulley 128 which serves as a drive pulley is connected by a slip clutch (not shown) to a manually operable drive wheel 136, the periphery of which protrudes through the front panel 84.

The numerals 135 are visible through a magnifying window 138 which serves as an index to indicate the position of the message head relative to the recorded incoming messages. When the second guide means 110 is swung to its retracted position at which the message head 108 is released from the lead screw 100, the drive wheel 136 may be manipulated with the guidance of the numerals 135 to place the message head in position to play back any selected recorded incoming message.

Referring to FIG. 1, the answering device has a cyclic control including an automatically operated switch rotor 140 and a manual control including a similar switch rotor 142. The cyclic control functions to carry out the cycle comprising a preliminary stage of 10 seconds, an announce stage of 20 seconds during which the recorded outgoing message is reproduced, and a recording stage of 30 seconds during which the incoming message is recorded.

In this particular embodiment of the invention the cyclic control comprises a first fixed structure in the form of two spaced parallel plates 144 and an associated movable structure or rotary assembly which includes the first switch rotor 140, the switch rotor being positioned between the two plates 144. The manual control comprises a third fixed structure in the form of two parallel plates 146 and a fourth movable structure in the form of a rotary assembly that includes the second switch rotor 142, the second switch rotor being positioned between the two plates 146. As may be seen in FIGS. 1 and 12, the two fixed structures comprising the first pair of plates 144 and the second pair of plates 146 are consolidated into a single unitary structure which includes two small printed circuit panels 152 located at diametrically opposite positions adjacent the peripheries of the two switch rotors.

Each of the two switch rotors 140 and 142 has a concentric arrangement of contacts on its opposite faces and each switch rotor is of laminated construction including a lamination in the form of a grounded copper disc 153 to function as a shield between the opposite faces of the rotor. Each of the four stationary plates 144, 146 carries a plurality of brush elements 154 to cooperate with the corresponding concentric contacts for switching operation. In the construction shown, the brush elements 154 are leaf spring wipers which operate through windows 155 of the corresponding fixed plates. In this instance each fixed plate 144, 146 has two confronting sets of seven elements 154 each that are connected by conductors 156 to the corresponding printed circuit panels 152.

The use of a single fixed structure to cooperate with the two rotary switches of the cyclic control and the manual control, respectively, results in simplification and reduced costs in that the two controls may share the same circuitry for functions that are common to the two controls. In this respect further simplification is achieved by consolidating pairs of the leaf spring wipers 154 in the manner indicated in FIG. 11*a*. FIG. 11*a* shows how a single U-shaped leaf spring member 154*a* may be mounted in one of the two circuit panels 152, the leaf spring member having two integral wiper arms 154*b* as shown to cooperate with the two rotary switches respectively. Thus closely associating the two rotary switches with each other makes possible not only the use of a single associated fixed structure instead of two but also makes possible the use in some instances of a single wiper member instead of two. In effect, the substitution of the dual wiper member 154*a* is the substitution of a single pole double throw switch for two single pole single throw switches.

The rotary assembly of the cyclic control includes a shaft 158 which carries the first switch rotor 140 and is driven by a suitable cycle motor 160 through a gear box 162, the cycle motor driving the shaft through one complete revolution in approximately 60 seconds to carry out the desired operating cycle.

Preferably as indicated in the wiring diagram in FIG. 10*a* the switch for the cycle motor 160 is shunted by means to permit enough current to flow through the motor to increase the coasting of the motor when the motor switch is open but not enough current to keep the motor operating. For example the shunt may comprise a .02 farad capacitor 159 in series with a 100 ohm resistor 161.

The shaft 158 carries the previously mentioned radial arm 78 and at the normal or starting position of the shaft shown in FIG. 1, the radial arm abuts the operating finger 76 of the control member 74 to keep the cable 65 taut as heretofore mentioned. Initial rotation of the shaft 158 clockwise as viewed in FIG. 1 carries the arm 78 past the operating finger 76 to release the cable 65 from tension and thus permit the hinged leaf 62 in the auxiliary cradle 20 to rise and release the two telephone plungers 60 for operating the answering switch of the telephone. In effect the hinged leaf 62 is normally latched and is unlatched in response to an incoming call to release the two telephone plungers 60. In the meantime, the motor 90 is energized for rotation of the recording drum 86 an the associated lead screw 100.

At the beginning of the second or announce stage of the automatic cycle, a rotary cam 164 (FIGS. 1 and 6) on the shaft 158 cooperates with a follower 165 to shift the previously mentioned first guide means 106 from its retracted position to its effective position to place the announce head 105 in engagement with the lead screw 100 to play back the prerecorded outgoing message. In the construction shown the follower 165 is in the form of a shoe on the outer end of an arm 166 that is rigidly connected to the lower rod 114 of the first guide means 106. At the end of the announce stage, the rotary cam 164 causes the first guide means 105 to disengage the announce head 105 from the lead screw to permit the spring 125 to return the announce head to its starting position. Then to begin the second stage of the cycle, a second cam 168 on the shaft 158 cooperates with a follower 170 to bring the message head 108 into engagement with the return screw 100, the follower 170 being on the end of an arm 172 that fixedly extends from the lower rod 120 of the second guide means 110. During the 30 seconds of the final stage, the message head 108 records the incoming message on the drum 86.

The second rotary assembly which is the rotary assembly of the manual control includes a shaft 174 that carries the second switch rotor 142 and is manually operable by a knob 175 on the front panel 84. The knob 175 has four positions, namely a first position for playing back recorded incoming messages, a second off position, a third automatic answer position which makes the cyclic control 140 effective and a fourth position for prerecording an announcement or outgoing message by means of the announce head 105. As shown in FIGS. 1 and 11, a suitable detent means to releasably retain the knob 175 at each of its four positions may comprise a rectangular block 176 on the shaft 174 and leaf spring 178 which presses against the side of the rectangular block. In the construction shown, the leaf spring 178 depends from one of the previously mentioned longitudinal connecting rods 85.

Any suitable means may be provided to indicate the four positions of the manual knob 175. As may be seen in FIG. 6 where the front panel 84 is shown in phantom, four small apertures 180 in the front panel represent the four positions of the manual control and a rectangular plate 182 behind the panel carries four dots 183 or light-responsive paint which registers with the four apertures respectively to indicate the four positions of the manual control. By "light-responsive" paint is meant a paint that emanates more light than mere reflection of light. For example the light-responsive paint may be either luminescent or fluorescent paint. As shown, the rectangular plate 182 is slidingly mounted in upper and lower guides 184 and is biased by a coil spring 185 against a cam 186 that is carried by the manual shaft 174.

For prerecording an announcement or outgoing message, a cam 202 on the shaft 174 displaces a follower 204 on an arm 205 of the first guide means 106 to bring the announce head 105 in engagement with the lead screw 100. At the setting of the manual knob 174 for playing back recorded incoming calls, a second cam 206 on the shaft 174 cooperates with a follower 208 on an arm 210 of the second guide means 110 to bring the message head 108 into engagement with the lead screw 100.

As heretofore stated, a feature of the invention is the provision of a loudspeaker to broadcast an incoming message while the incoming message is being recorded. FIG. 1 shows how a loudspeaker 212 may be mounted in the housing for this purpose.

The structure in FIG. 1 further includes a small casing 213 mounted on the outer surface of the back wall 82 of the housing which casing is provided with various jacks. The purpose of a first jack is to plug in an auxiliary microphone designated 214 in FIGS. 18 and 19 for the purpose of prerecording an outgoing message, the auxiliary microphone being a dual-purpose speaker mike. As will be explained the purpose of a second jack (FIG. 18) is to plug in the speaker mike 214 for demonstrating the answering device in the absence of a telephone. The purpose of a third jack (FIG. 18) is to plug in a remote sensor for those installations where the ringing circuit is separate from and remote from the telephone per se. A fourth jack (FIG. 18) is for plugging in the speaker mike 214 for listening in private to the play back of a recorded incoming message.

The front panel 84 of the housing is provided with various controls in addition to the previously mentioned manual knob 175 and manually operable drive wheel 136. One of the additional controls is a volume control 215. Another control is a pushbutton test switch 216. Still another control is a small handle 218 which is shown in a neutral position in FIG. 1 and which may be swung downward throughout one revolution of the drum 86 to erase the prerecorded outgoing message and may be swung upward throughout one revolution of the drum to erase all of the recorded incoming messages.

The handle 218 is on a shaft 220 which is normally maintained in a neutral position by a coil spring 222, one end of which is fixed and one end of which is connected to a radial arm 224 of the shaft. An upper arcuate arm 225 of the shaft 224 carries a relatively short permanent magnet 226 of a length to erase a prerecorded outgoing message and a pair of lower arcuate arms 228 of the shaft carry a second relatively long permanent magnet 230 of a length to span all of the recorded incoming messages. It is apparent that the two permanent magnets 226 and 230 are normally retracted from the drum 86 but may be moved selectively against the drum by swinging the handle 218 in opposite directions.

FIG. 5 shows a fluid-actuated system which may be substituted for the previously mentioned flexible cable 65 for remote control of the two plungers 60 of the telephone. In FIG. 5 the auxiliary cradle 20*a* is provided with a leaf spring 232 which normally depresses one of the two telephone plungers 60 since it is not necessary to depress both of the plungers. At the same time the leaf spring 232 normally compresses a small bellows 233 that is connected by a small flexible duct 234 to a second bellows 235 that is mounted on a bracket 236. The second bellows carries an operating plunger 237 that slides in a guide 238 in contact with a cam 239 on the previously mentioned cycle control shaft 158. At the normal idle position of the cyclic control shaft 158, the bellows 235 is expanded. The initial rotation of the shaft 158 to carry out an operating cycle causes the cam 239 to contract the bellows 235 to cause the first bellows 233 to expand and thereby flex the leaf spring 232 to release the plunger 60 for the purpose of answering the telephone call. The fluid employed in the two bellows may be either a gas or a liquid.

FIG. 10 shows still another arrangement that may be substituted for the previously mentioned cable 65 to control the two plungers 60 of the telephone. In FIG. 10 the hinged leaf 62 in the auxiliary cradle 20*b* is controlled by a cam 240 that is operated by a motor 242 through a gear box 244, the cam being rotated at the rate of 1 r.p.m. Normally the motor 242 is deenergized with the cam 240 holding the hinged leaf 62 down to depress the two telephone plungers 60. The motor circuit is controlled by two switches in parallel, one switch being a microswitch 245 which is normally held open by the downwardly pressed hinged leaf 62. The other switch 246 which is connected to the auxiliary cradle 20*b* by conductors in a cable 248 is normally held open by a cam 250 on the previously mentioned cyclic control shaft 158. Initial rotation of the cyclic control shaft 158 out of its normal position releases the switch 246 to permit the switch to close to energize the motor 242. Energization of the motor 242 causes the cam 240 to release the hinged leaf 62 to permit the two telephone plungers 60 to elevate the hinged leaf. The elevation of the hinged leaf 62 causes the microswitch 245 to close in parallel with the switch 246. When the cyclic control shaft 158 completes its revolution the associated cam 250 again opens the switch 246 but the switch 245 in the auxiliary cradle remains closed until the cam 240 again depresses the hinged leaf 62 to depress the two telephone plungers 60.

FIG. 9*a* indicates how the previously mentioned sensing coil 68 in the auxiliary cradle 20 may be replaced by a component adapted to pick up the vibration of the base unit 25 when the ringing circuit is energized. FIG. 9*a* shows a cartridge 252 with a stylus 254 extending therefrom into contact with the conventional cradle 24 of the base unit of the telephone. The cartridge 252 is of the type commonly employed as a transducer for reproducing a recording on a phonograph disc. When the cartridge 252 senses the vibration of the base unit of the telephone by the ringing circuit it functions in the same manner as the previously mentioned coil 68 to cause operation of the cyclic control 140. A microswitch 255 is mounted on the auxiliary cradle 20*c* to be normally closed by the weight of the telephone handset. When the handset is lifted from the auxiliary cradle 20*c*, he microswitch 255 opens to make the cartridge 252 inoperative.

ELECTRICAL COMPONENTS OF THE CONTROL SYSTEM

FIGS. 13 and 14 show the two opposite faces of the first switch rotor 145 of the cyclic control and FIGS. 15 and 16 show the two opposite faces of the second switch rotor 148 of the manual control.

As can be seen in FIGS. 13 and 14, one face of the first switch rotor 140 has seven concentric arcuate contacts designated A-1 to A-7, the contact A-7 being a continuous circular grounding contact. The second face of the switch rotor has seven contacts, designated B-1 to B-7, the last being a continuous grounding contact. Each of the two sets of arcuate contacts cooperates with two sets of seven each of the previously described wiper elements 154. The arrows designated R in FIGS. 13 and 14 indicate the directions of rotation of the two sets of contacts.

Since the manual control has four positions 90° apart, the contacts on each of the two opposite faces of the second switch rotor 142 need not be arcuate although they are illustrated as arcuate in FIGS. 15 and 16. As shown in FIG. 15 one face of the second switch rotor 142 has seven contacts C-1 to C-7, the last being a grounding contact and as shown in FIG. 16 the second face of the second switch rotor has seven contacts D-1 to D-7, the last being a grounding contact.

A clearer understanding of the control system of the telephone answering device of the present invention may be understood by reference to FIG. 17 which shows the functions of the four sets of contacts of the two switch rotors 140 and 142. FIG. 17 includes four functional blocks which are identified by reference characters A through D. Block A relates to the pattern of arcuate contacts on the first face of the first switch rotor 140 shown in FIG. 13; Block B relates to the pattern of arcuate contacts on the second face of the first switch rotor shown 140 in FIG. 14; Block C relates to the pattern of manual control contacts on one face of the second switch rotor 142 shown in FIG. 15; Block D relates to the pattern of manual control contacts on the second face of the second switch rotor shown in FIG. 16.

The two Blocks A and B are subdivided vertically into three columns, the first column representing the first or preliminary stage of the automatic cycle, the second column representing the second or announcing stage of the automatic cycle and the third column representing the third or message-recording stage of the automatic cycle. The two Blocks C and D are divided vertically into four columns representing, respectively, the play back position of the manual control, the off position, the automatic answering position and the position for recording an announcement or outgoing message.

Along the two opposite sides of the Blocks A —D are shown various components in the telephone answering device which are interconnected by the contacts on the two switch rotors. A hatched rectangle indicates that the contact is effective to serve as a switch in cooperation with two wiper elements 154 to interconnect two components. For example, in Block A, contact A-1 serves to connect the message head to the output of the amplifier during the third or message-recording stage of the automatic cycle. As another example, in Block B the pickup unit 35 that picks up the caller's message is connected by contact B-2 to the input of the amplifier during the third or message-recording stage of the automatic cycle. Thus the contacts of the four switch rotor faces may be identified from 1 through 7 in accordance with their relative positions starting from the centers of the switch rotors as indicated in FIGS. 13—16.

For manual operation of the telephone answering device, the two switch rotor faces of FIGS. 15 and 16 merely provide stationary positions. The functional diagram for these stationary positions is shown in Blocks C and D of FIG. 17. As an example, when the manual control is in the play back position, the message head 108 is connected to the input of the amplifier through the contact C-1 of FIG. 15 as shown in Block C and the loudspeaker is connected to the output of the amplifier through the contact D-6 of FIG. 16 as shown in Block D. Thus messages previously recorded on the magnetic drum 86 during the third stage of the cycle are read by the message head 108 and are applied to the loudspeaker 212. All of the various connections for the four different positions of the manual control are show in this manner in Blocks C and D.

FIG. 18 is a block diagram showing the various interconnections within the telephone answering device that are employed for the automatic cycle and FIG. 19 is a block diagram showing the various interconnections employed at two different positions of the manual control.

With reference to FIG. 18 relating to the automatic cycle, the previously mentioned ringing sensor 68 is connected to a high pass filter 256 which in turn is connected to the input of the amplifier 258 by contacts B-3 and C-3 of the first switch rotor 140. The ringing sensor uses a ringing detection circuit which responds only to frequencies higher than the ordinary ringing frequency of 60 cycles because the high pass filter 256 eliminates the ordinary ringing frequency signal. It has been found that the ringing circuit in a telephone generates a substantial amount of harmonic distortion which is passed by the high pass filter. Thus the high pass filter avoids unwanted activation of the telephone answering device that could be caused by electrical appliances which use 60 cycle house current.

The previously mentioned third jack permits a remote sensor 262 to be plugged in when the ringing circuits of the telephone are remote from the telephone proper. Plugging in the remote sensor 262 disconnects the ringing sensor 68. The announce head 105 is connected to the input of the amplifier 258 through the contact B-1 of the first switch rotor 140. The previously mentioned pickup unit 35 on the auxiliary cradle 20 which picks up the incoming message during the third stage of the automatic cycle is connected to the input of the amplifier through contact B-2 of the first switch rotor 140. A power source 264 is connected through contact B-4 of the first switch rotor 140 to a bias oscillator 265 for the message head 108. The source of power 264 is also connected to the drum motor 90 through contact A-3 of the first switch rotor 140.

As further shown in FIG. 18, contacts A-1, A-2, A-4, A-5 and A-6 are employed at various times in the operating cycle to connect the output of the amplifier 258 to various components. As heretofore stated, contact A-1 connects the output of the amplifier to the message head 108 for the third stage of the cycle. Contact A-2 connects the output of the amplifier to the input of the amplifier for feedback to produce a beep signal at the end of the second or announce stage of the automatic cycle to indicate to the caller that the answering device is ready to record an incoming message.

Contact A-4 connects the output of the amplifier to a relay 266 through two switches in series, namely the previously mentioned normally open limit switch 127 and contact D-2 of the manually controlled switch rotor 142. The contact D-2 is effective to pass current only when the manually operated switch rotor 142 is in the position for automatic answering. At the other three positions of the manual switch rotor 142 including the off position, the contact D-2 is in open circuit position to prevent the operation of the automatic cycle. The relay 266 is operated intermittently by the ringing sensor 68 to apply power intermittently to the automatic cycle motor 160 until contact B-6 of the first switch rotor 140 becomes effective to keep the motor energized for a full cycle. The previously mentioned test switch 216 may also be employed to energize the automatic cycle motor 160 independently of the relay 266 and contact B-6.

Contact A-5 connects the output of the amplifier to the transmitter microphone 38 on the auxiliary cradle 20 to deliver the prerecorded announcement or outgoing message to the caller. Contact A-6 of the first switch rotor 140 connects the output of the amplifier to the loudspeaker 212 at the same time that the contact A-1 connects the output of the amplifier to the message head 108 for recording the incoming message.

As indicated in FIG. 19, when the manual control is at the playback setting, the message head 108 is connected to the input of the amplifier 258 by contact C-1 of the manual switch rotor 142 at the same time that the contact D-3 of the manual switch rotor connects the power source 264 to the drum motor 90 and the contact D-6 connects the output of the amplifier to the loudspeaker 212. At the same time, contact D-5 of the manual switch rotor 142 connects the output of the amplifier to the fourth jack 268 so that, if desired, the previously mentioned speaker mike 214 may be plugged into the fourth jack. With the volume of the loudspeaker turned down, the subscriber may apply the speaker mike 214 to his ear to listen in private to the playback of an incoming message.

FIG. 19 further shows the interconnections that are effective when the manual control is at the setting for recording an announcement or outgoing message. The previously mentioned speaker mike 214 is plugged into the first jack which is connected by contact C-2 to the input of the amplifier 258. At the same time, contact C-4 of the manual switch rotor 142 connects the power source 264 to the previously mentioned bias oscillator 265 for operation with the announce head 105. At the same time, contact D-4 connects the output of the amplifier to an 8 ohm load 272 and contact D-3 connects the power source 264 to the drum motor 90.

OPERATION

The manner in which the described device functions for its purpose may be readily understood from the foregoing description.

To record an announcement or outgoing message, the subscriber plugs the speaker mike 214 into the first jack 270 and turns the knob 175 of the manual control to the position for recording announcement and a dot of fluorescent paint appears at the corresponding indicating aperture 180 on the panel 84. As may be seen in the chart in FIG. 17 and in FIGS. 15 and 16, this adjustment of the manual control brings into operation the contacts C-2, C-4, C-6, C-7, D-1, D-3, D-4 and D-7 of the manual switch rotor 142 to complete the operating connections shown in the lower portion of FIG. 19. The adjustment of the manual knob 175 to this position rotates the cam 202 of the manual control to bring the announce head 105 into engagement with the lead screw 100 with the consequence that the announce head traverses the corresponding portion of the recording drum 86. The subscriber then speaks into the speaker microphone 214 to record the desired announcement.

To check the recorded announcement, the subscriber may turn the manual control knob 175 to the automatic answer position to make the cyclic control 140 operative. The test button 216 may then be pressed to energize the cyclic control motor 160 until the contact B-6 of the switch rotor 140 becomes effective to carry out the automatic cycle. The subscriber may then listen to the reproduction of the recorded outgoing message.

With the auxiliary cradle 20 supporting the handset of the telephone, the answering device may be readied for automatic operation by simply rotating the manual control knob 175 to the automatic answer position. The chart in FIG. 17 shows that the contacts of the two rotary switches 140 and 142 are effective to complete the operating connections shown in FIG. 18. The contacts shown in FIG. 17 are: A-4 to cooperate with the normally closed limit switch 127 and D-2 to ready the relay 266 for subsequent operation in response to the ringing sensor 68; grounding contact A-7; B-3 to cooperate with C-3 to ready the amplifier 258 for activation by the ringing sensor 68; grounding contact B-7; C-3 to cooperate with B-3; grounding contact C-7; D-2 to cooperate with the normally closed limit switch 127 and A-4 to ready the relay 266 for subsequent operation in response to the amplifier 258; and grounding contact D-7.

When an incoming call causes energization of the ringing circuit of the telephone, the ringing sensor 68 response to activate the amplifier 258 through the high pass filter 256 to operate the relay 266 to connect the automatic cyclic motor 160 to the power source 264. The automatic cycle motor 160 is advanced intermittently each time the ringing circuit operates until finally the switch rotor 140 is advanced far enough for contact B-6 to energize the cyclic control motor independently of the operation of the ringing sensor. At the end of the preliminary stage of the cycle indicated by the first column of blocks A and B of FIG. 17, the drum motor 90 is energized through contact B-6 to operate the recording drum 86.

A telephone answering device that answers the phone at the first ring of the phone, or even interrupts the first ring, startles the caller and forcibly informs him that the phone is being answered by an automatic device. On the other hand, if the telephone rings a random number of times in the usual manner the caller is more at ease. The telephone in this instance rings a random number of times because, in the first place, more than one ring is necessary to advance the switch rotor 140 from a starting position to the point to make contact B-6 effective and, in the second place, because the previously described shunt across the switch of the motor 160 makes indeterminate the extent to which the switch rotor coasts to a new starting position at the end of a cycle. The shunt also serves to prevent arcing and to prevent oscillation that occurs when a wiper stops immediately adjacent a contact.

As the switch rotor 140 rotates to the point of initiating the second stage or announce stage of the cycle, cam 165 causes the first guide means 106 to move the announce head 105 into engagement with the lead screw 100.

The second column of blocks A and B and the third column of blocks C and D indicate which contacts of the two switch rotors 140 and 142 are effective for the second stage of the cycle. A-3 connects the power source to the recording drum 90; A-5 connects the output of the amplifier 258 to the transmitter microphone 38; A-6 also connects the output of the amplifier to the loudspeaker; B-1 connects the announce head 105 to the input of the amplifier; and B-6 continues to energize the automatic cycle motor 160.

As the announce head 105 reproduces the prerecorded outgoing message, the message is broadcast by the loudspeaker 212 so that if the subscriber is present, he is alerted to the fact that an incoming call is being made. If there are others in the room and the subscriber would like to hear the incoming message in private, he may at this time turn down the volume to make the loudspeaker ineffective and may plug the speaker mike 214 into the fourth jack so that he may listen to the incoming call in private. At the end of the announce stage, contact A-2 connects the output of the amplifier to the input of the amplifier to create a beep sound to notify the caller of the beginning of the 30 second period in which the incoming message may be recorded.

As the switch rotor 145 enters the third stage represented by the third column in blocks A and B of FIG. 17, cam 165 acting on the first guide means disengages the announce head 105 from the lead screw 100 to permit the coil spring 125 to return the sound head to its starting position. Immediately thereafter, the cam 164 actuates the second guide means 110 to bring the message head 108 into engagement with the lead screw 100. In the third stage, contact A-1 connects the output of the amplifier 258 to the message head 108 for recording the incoming call. A-3 continues to energize the recording drum motor and A-6 continues to connect the output of the amplifier to the loudspeaker 212. B-2 connects the pickup unit 35 to the input of the amplifier so that the incoming message may be recorded and B-4 supplies power to the bias oscillator 265 for the message head 108. B-6 continues to energize the automatic cycle motor 160. If the subscriber is present he may lift the handset from the auxiliary cradle and stop the cycle to talk personally to the caller.

When a subscriber desires to review the series of incoming messages that have been received during his absence, he first notes at the window 138 the number of incoming messages that have been recorded and then he turns the manual knob 175 to the off position. The subscriber manipulates the drive wheel 136 at the panel to return the message head 108 to its starting position and then turns the manual knob 175 to the playback position to listen as the messages are delivered in sequence by the loudspeaker 212. Selected phrases of the messages may be replayed if desired. Where a recorded incoming message is quite short, the subscriber may manipulate the manual drive wheel 136 to jump across the blank space to the next message. Any particular message may be reviewed again by manipulating the drive wheel to return the message head to selected message with the guidance of numerals appearing at the window 138.

Referring to Blocks C and D in FIG. 17 and referring to FIG. 19, it is seen that contact C-1 connects the message head 108 to the input of the amplifier 258; contact D-3 energizes the recording drum motor; contact D-5 connects the output of the amplifier to the fourth jack; and contact D-6 also connects the output of the amplifier to the speaker 212. If others are present and the subscriber wishes to listen to the message in private, he plugs the speaker mike 214 into the fourth jack and turns down the volume of the loudspeaker.

After the subscriber has reviewed all of the incoming messages he has random access to permit playing back any selected message. Thus if it is desired to repeat the message No. 4, the subscriber turns the manual knob 175 to the off position, manipulates the drive wheel 136 to bring numeral No. 4 to the window 138 and then returns the manual knob to the playback position to cause the message head to repeat the selected call.

As heretofore pointed out, the grouping together of the rotary switch of the cycle control, the rotary switch of the manual control and fixed structure common to the two rotary switches makes it possible for the two switches to share common circuit components for functions that are common to the two rotary switches. Referring to FIG. 17, it is apparent that the following electrical functions are common to the two rotary switches: connecting the speaker to the output of the amplifier; connecting the power source to the drum motor; connecting the relay to the output of the amplifier; connecting the speaker mike to the output of the amplifier; and connecting the ringing sensor to the input of the amplifier. A single wiper element 154*a* (FIG. 11*a*) may be used advantageously in each of these examples.

The answering device may be tested any time by simply turning the manual control knob 175 to the automatic answer position and then operating the tests switch 216 until contact A-6 energizes the cycle control motor 160 independently of the test switch.

To demonstrate the answering device in the absence of a telephone, the speaker mike is plugged into the first jack and the manual knob 175 is turned to the position for recording an outgoing message by means of the announce head 105. After the outgoing message is recorded, the speaker mike is plugged into the second jack to serve as a substitute for the pickup unit 35. Manual knob 175 is then turned to automatic answer and the test switch 216 is operated to initiate the operating cycle. The device will then automatically announce the recorded outgoing message followed by a beep to indicate that it is now time to record an incoming message. The incoming message may then be spoken into the speaker mike. After the cycle is completed, the manual knob 175 may be turned to the playback position to repeat the incoming message that has been recorded by means of the speaker mike.

My description in specific detail of the presently preferred practice of the invention will suggest various changes, substitutions and other departures from my disclosure within the spirit and scope of the appended claims.

We claim:

1. An automatic answering device for use with a telephone having a cradle and a handset, said cradle having an outwardly biased answering switch, said handset having an earpiece a mouthpiece, said answering device having in combination:

an auxiliary cradle to be interposed between said cradle and said handset to support the handset;

retractable means on said auxiliary cradle normally depressing said answering switch irrespective of handset location;

a transmitter microphone on said auxiliary cradle positioned to deliver an outgoing message to said mouthpiece;

pickup means on said auxiliary cradle positioned to cooperate with said earpiece to pick up incoming messages;

sensing means to sense operation of the ringing circuit of the telephone;

a power-actuated magnetic drum recording medium having a first portion for a prerecorded outgoing message and a second portion for recording an incoming message;

a power-actuated lead screw adjacent the drum;

a first transducer cooperative with said first portion to reproduce the outgoing message;

a second transducer cooperative with said second portion to record an incoming message;

a first fixed structure;

a second structure movable relative to the first structure, one of said first and second structures having a plurality of elongated contacts extending in the direction of the relative movement between the two structures, the other of said two structures having a plurality of elements cooperative with said contacts for sequential switching;

plural means responsive to said sensing means to retract said retractable means on the auxiliary cradle and to cause relative movement between said first and second structures respectively to carry out a multiple stage cycle including a stage for reproduction of the outgoing message and a subsequent stage for recording an incoming message;

plural means operatively connected to said second structure for actuation thereby respectively to cause said first transducer to operate during said first mentioned stage and to cause said second transducer to operate during said subsequent stage; and manually operable control means linked to operate said first transducer for recording an outgoing message and to operate said second transducer to play back a recorded incoming message.

2. A combination as set forth in claim 1 in which said manually operable control means includes a third structure and a fourth structure manually movable relative to the third structure, one of said third and fourth structures having a plurality of contacts, the other of said third and fourth structures having a plurality of elements cooperative with said contacts for switching operations; and which includes plural means operatively connected to said fourth structure for actuation by movement thereof respectively to cause said first transducer to operate for recording an outgoing message and to cause said second transducer to operate to play back a recorded incoming message.

3. A combination as set forth in claim 2 in which said four structures are grouped together and which includes printed circuit means adjacent the four structures and connected in common to at least some elements of the four structures.

4. In a device of the character described for use with a telephone having a normally depressed answer switch, the combination of:

a first fixed means;

a second movable means;

power means to move said second means relative to the first means along a given path to carry out an operating cycle, one of said first and second means having a plurality of elongated contacts extending in the direction of said path, the other of said first and second means having a plurality of elements cooperative with said contacts for sequential switching operations in the cycle;

plural means to release the depressed answer switch and to energize said power means respectively to carry out said cycle in response to an incoming telephone call;

means synchronized with said cycle to cause relative movement between a first transducer and a first recording medium to reproduce a previously recorded outgoing message and subsequently to cause relative movement between a second transducer and a second recording medium record an incoming message from the caller, the first and second recording media being respective portions of a power-actuated drum;

a power-actuated lead screw adjacent the drum;

a third fixed means;

a fourth movable rotary switching means;

manually operable means to move said fourth means relative to said third means along a second given path, one of said third and fourth means having a pattern of contacts extending in the direction of said second path, the other of said third and fourth means having a plurality of elements cooperative with said contact; and means responsive to a given position of said fourth means relative to said third means to move said second transducer along the second recording medium to reproduce recorded incoming messages.

5. In a device of the character described for use with a telephone having an answer switch, the combination of:

rotary switch means;

power means to operate the rotary switch means through a multiple stage cycle;

means responsive to an incoming call to operate said answer switch and to operate said rotary switch means;

a power-actuated drum having a recording medium with separate portions for incoming and outgoing messages;

a first transducer movable to reproduce an outgoing message;

a second transducer movable to record a succession of incoming messages;

lead screw means to move said transducers, the two transducers being normally retracted from the lead screw means;

cam means mechanically connected to said rotary switch means to move said first transducer into operative coupling with said screw means to reproduce an outgoing message at an early stage in the cycle and to retract the first transducer from operative coupling with the screw means after the outgoing message is reproduced;

means to return the first transducer to its starting position after it is retracted from coupling with the screw means; and cam means mechanically connected to said rotary switch to move said second transducer into operative coupling with said screw means to record an incoming message at a later stage in the cycle.

6. A combination as set forth in claim 5 which includes a second manually operable rotary switch and plural cam means mechanically connected to the second rotary switch to move the two transducers in sequence respectively into and out of operative coupling with said lead screw means.

7. In a device of the character described for use with a telephone having a normally depressed outwardly biased answering switch, the combination of:

a power-actuated drum, said drum having a recording medium thereon with a first portion for a recorded outgoing message and a second portion for recording an ingoing message;

a power-actuated lead screw parallel to and adjacent to the drum;

a first transducer movable from a retracted position to an operating position coupled to the lead screw to traverse said first portion of the recording medium;

a second transducer movable from a retracted position to an operating position coupled to the lead screw to record an incoming message on said second portion of the recording medium;

a rotary control assembly;

means to rotate said rotary control assembly in response to the ringing circuit of the telephone thereby to carry out an operating cycle having one stage in which the outgoing message is reproduced and a later stage in which the ingoing message is recorded;

means responsive to initial rotation of said rotary control assembly to release the depressed answering switch of the telephone during the operating cycle;

means mechanically interconnecting the rotary control assembly and said first transducer to move the first transducer to its operating position for the first mentioned stage of the cycle; and means mechanically interconnecting the rotary control assembly and said second transducer to move the second transducer to its operating position for the second mentioned stage of the cycle.

8. A combination as set forth in claim 7 which includes manual means having one setting to permit dictating and recording the outgoing message, said manual means having another setting to play back a recorded message, said manual means having a third setting to make said rotary control assembly operative, the rotary assembly being inoperative at the first two mentioned settings of the manual means.